H. SNYDER.
HORSE FORK HOOK.
No. 187,190. Patented Feb. 6, 1877.
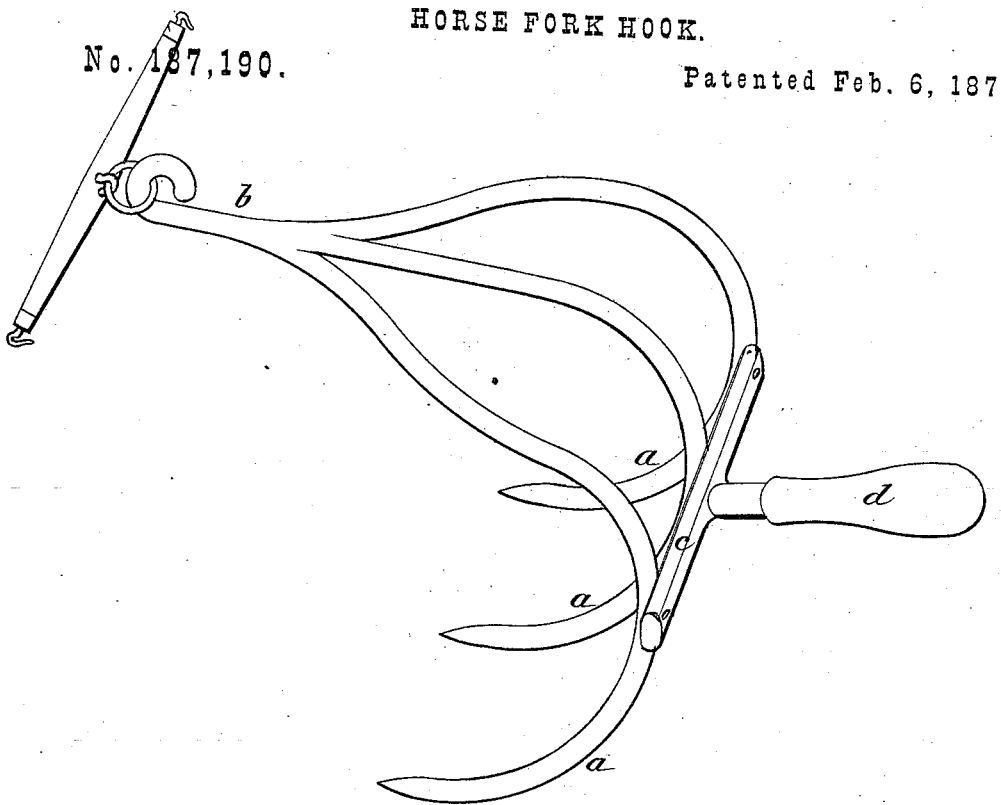
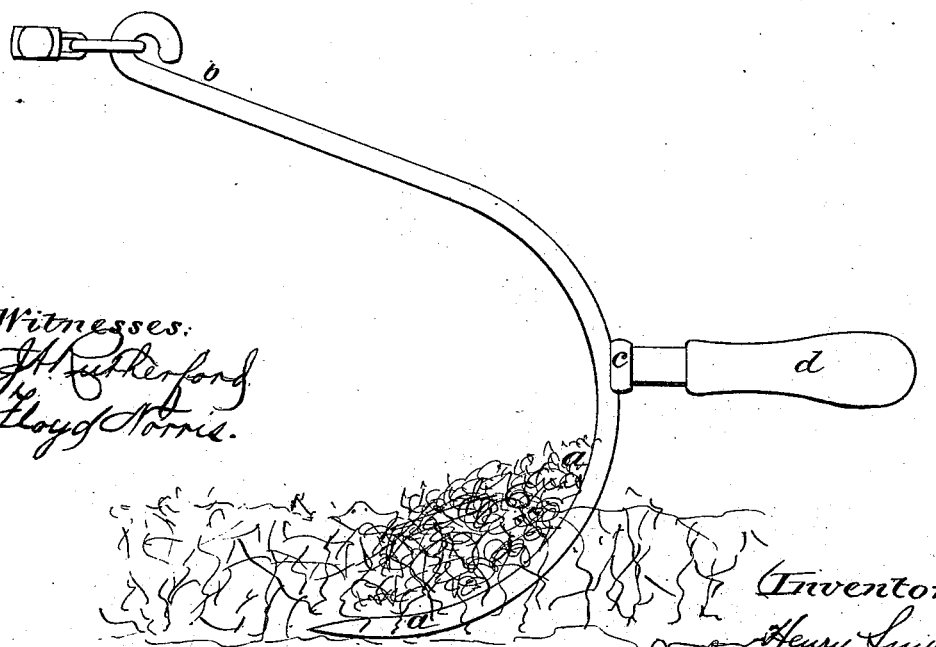
Witnesses:
J H Rutherford
Floyd Norris
Inventor
Henry Snyder
by Johnson & Johnson
Att'ys.

UNITED STATES PATENT OFFICE.

HENRY SNYDER, OF CONWAY, MICHIGAN.

IMPROVEMENT IN HORSE FORK-HOOKS.

Specification forming part of Letters Patent No. 187,190, dated February 6, 1877; application filed December 19, 1876.

*To all whom it may concern:*

Be it known that I, HENRY SNYDER, of Conway, in the county of Livingston and State of Michigan, have invented a new and useful Improvement in Horse Fork-Hooks, specially adapted for pulling willows from swamps and low lands, of which the following is a specification:

The drawings represent views, in perspective and elevation, of my improved fork-hook, in which the tine-forks $a$ are curved and joined together at their upper ends, where they are welded and form the shank-hook $b$, for the attachment of the single or double tree for the horses to draw by. The draft shank-hook, by this construction, is formed by the tine-hooks and stands centrally with them. A back cross-bar, $c$, is secured to and braces the tine-hooks at about the middle of their curve, and in line with the central one, of which a strong handle, $d$, projects rearwardly from the cross-bar, by which the fork-hook is managed and raised to free it from the clogging willows, or to dump the load, and thus prevent the hooks from clogging. By this handle the workman has entire control over the hook and the draft of the team.

It can be operated by one or two horses, and is light and easily handled. The handle or lever stands back of the hook, and on the convex side of their curve, in nearly a horizontal position, so that the workman can easily grasp it to hold the hook to work, or raise it or keep it in the draft of the team. It is designed to help the farmer clean wet and swampy lands overgrown with willows and the like; and the means for controlling it while at work is of much advantage. The tines are made strong and are firmly braced.

Implements for pulling brush and roots, and which have curved claws, and united to form the draft-eye, have been long used, but such implement has no means of controlling it in any particular. Manure-drags, having curved lines hinged to a separate draft-beam, with handles rising upward from said beam like a plow, and in which the tines are hinged so as to be revolved upon said separate draft-beam, are also well known, but my fork-hook has no such construction, nor does it relate to the character of implement constructed with hinges, catches, and levers, by which it may be revolved to dislodge the load. There is another class of forks, called "horse hay-forks," used in loading and stacking hay. Such I do not claim.

I claim—

The horse fork-hook, consisting of the curved hooks $a$, united to form the shank draft-hook $b$, and combined with the centrally rearward-projecting handle or lever $d$, and its rigid bar $c$, upon the back curve of the tines, for use as described.

In testimony whereof I have hereunto set my hand in the presence of two witnesses.

HENRY SNYDER.

Witnesses:
GEORGE H. ARCHER,
ISAAC B. TURNER.